UNITED STATES PATENT OFFICE 2,623,905

PRODUCTION OF ALIPHATIC ALDEHYDES

Herman Pines and Vladimir N. Ipatieff, Chicago, Ill., assignors to Universal Oil Products Company, Chicago, Ill., a corporation of Delaware No Drawing. Application August 23, 1950, Serial No. 181,100

5 Claims. (Cl. 260—604)

This invention relates to a process for producing carbonyl compounds and particularly for producing aliphatic aldehydes.

An object of this invention is the production of a carbonyl compound.

Another object of this invention is the production of an aliphatic aldehyde.

A further object of this invention is the production of isovaleraldehyde.

One embodiment of this invention relates to a process for producing an aliphatic aldehyde which comprises reacting H₂O and a conjugated diolefin-acting compound in the presence of an acid-acting catalyst.

Another embodiment of this invention relates to a process for producing an aliphatic aldehyde which comprises reacting a conjugated diolefin and water in the presence of a solid acid-acting catalyst.

A further embodiment of this invention relates to a process for producing an aliphatic aldehyde which comprises reacting a conjugated diolefin and steam in the presence of a solid acid-acting catalyst.

A still further embodiment of this invention relates to a process for producing isovaleraldehyde which comprises reacting isoprene and steam in the presence of a composite of alumina and aluminum fluoride.

We have found that isoprene, other conjugated alkadienes and compounds capable of isomerizing into conjugated diolefins during the reaction are converted into aliphatic aldehydes by heating with water in the presence of an acid-acting solid catalyst. In this treatment, H₂O, generally in the form of water vapor or steam, is present in a molar excess relative to the conjugated diolefin (preferably 2 to 5 mols of H₂O per mole of diolefin) or the conjugated diolefin-producing substances charged to the process in order to obtain a good yield of aldehyde with only a moderate amount of polymerization.

Solid acid-acting catalysts which are useful in this process include alumina treated with various mineral acids to form composites of alumina with salts of said acids such as sulfates, phosphates, fluorides and the like. Other acid-acting catalysts include composites of alumina with acid-acting salts such as zinc chloride, magnesium chloride, and the like, and also synthetically prepared composites of silica and alumina, alumina and magnesia, etc.

This process for hydrating conjugated diolefins is carried out in equipment designed for either batch or continuous types of operation. Thus in batch-type operation, a conjugated diolefin such as isoprene is contacted with a molar excess of H₂O, generally in the form of water vapor or steam, in the presence of one or more of the aforesaid acid-acting catalysts. In general, the diolefinic hydrocarbon is contacted with from about 1.5 to about 20 molecular proportions of water but preferably 2 to 5 molecular proportions of water and the resultant reaction mixture containing hydration products, unconverted starting materials and certain amount of diolefin polymers is subjected to suitable recovery treatment to separate the resultant aliphatic aldehyde from the other products of the process.

This process is generally carried out at a temperature of from about 150° to about 500° C. and preferably at a temperature of from about 200° to about 400° C. depending upon the particular catalyst used in the process. Also the hydration reaction is carried out continuously by passing a mixture of H₂O and a conjugated diolefinic hydrocarbon or substance capable of yielding a conjugated diolefin through a suitable reactor such as a catalyst tower containing one or more of the above-indicated solid acid-acting catalysts. The products obtained from such a reaction system are then subjected to suitable fractional distillation or other treatment to separate the aldehyde product from unconverted starting material, polymerization products, and water.

The following example is given to illustrate the results obtained by this process although these data are not indicated with the intention of limiting unduly the generally broad scope of the invention.

Isoprene (32.5 grams) and water (25.6 grams) in the molar ratio of 1:3 were passed at a temperature of 400° C. at an hourly liquid space velocity of 0.65 over a catalyst formed by treating activated alumina with sufficient hydrofluoric acid to give the alumina a fluorine content of 1.4% by weight. Fractional distillation of the resultant hydrocarbon product gives the following results:

TABLE

*Distillation data on isoprene hydration products*

| Cut | B. P., °C. | grams | $n_D^{20}$ |
|---|---|---|---|
| 1 | 31–36 | 19.7 | 1.4145 |
| 2 | –90 | 0.9 | 1.4068 |
| 3 | –95 | 4.5 | 1.3928 |
| 4 | –170 | 2.6 | 1.4451 |
| 5 | –172 | 0.9 | 1.4797 |
| Bottoms | 172 | 2.5 | 1.5188 |

NOTE.—Ultraviolet Analysis: Cut #1 contains 74% isoprene.

From the above indicated treatment, about 50% of the isoprene was recovered unchanged while the conversion products obtained consisted of pentenes amounting to about 35% of the isoprene reacting, and more than 25% of the isoprene was converted into an aldehyde, namely, isovaleraldehyde (cut 3). Higher boiling terpenic hydrocarbons were formed also by diremization of isoprene.

Although the reaction of this process is not known accurately or completely, it appears probable that this conversion may be represented by the following equations according to which isoprene is hydrated to an unsaturated alcohol which then undergoes isomerization into the aliphatic aldehyde such as isovaleraldehyde.

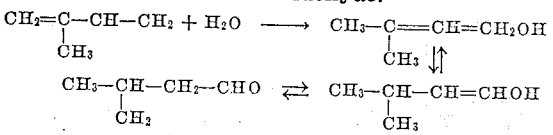

The formation of pentenes in the reaction product probably results from a hydrogen transfer reaction in which either (a) isoprene is the hydrogen acceptor and the dimers of isoprene are the hydrogen donor, or (b) isovaleraldehyde is the hydrogen acceptor and is converted to the corresponding saturated alcohol which in turn can undergo dehydration to olefins in the presence of the acid-acting catalyst.

We claim as our invention:

1. A process for producing isovaleraldehyde which comprises reacting one molecular proportion of isoprene and from about 1.5 to about 20 molecular proportions of $H_2O$ in the presence of a solid acid-acting catalyst at a temperature of from about 150° to about 500° C.

2. A process for producing isovaleraldehyde which comprises reacting one molecular proportion of isoprene and from about 1.5 to about 20 molecular proportions of steam in the presence of a solid acid-acting catalyst at a temperature of from about 200° to about 400° C.

3. A process for producing isovaleraldehyde which comprises reacting isoprene and $H_2O$ in the presence of alumina activated by hydrofluoric acid at a temperature of from about 150° to about 500° C.

4. A process for producing isovaleraldehyde which comprises reacting one molecular proportion of isoprene and from about 1.5 to about 20 molecular proportions of steam in the presence of a solid composite of alumina and aluminum fluoride at a temperature of from about 150° to about 500° C.

5. A process for producing isovaleraldehyde which comprises reacting one molecular proportion of isoprene and from about 2 to about 5 molecular proportions of steam in the presence of a solid composite of alumina and aluminum fluoride at a temperature of from about 200° to about 400° C.

HERMAN PINES.
VLADIMIR N. IPATIEFF.

REFERENCES CITED

The following references are of record in the file of this patent:

UNITED STATES PATENTS

| Number | Name | Date |
| --- | --- | --- |
| 2,060,086 | Kautter | Nov. 10, 1936 |

OTHER REFERENCES

Bourns et al., Can. J. Research, vol. 25B, pp. 80–89 (1947); vol. 26B, pp. 81–88 (1948).